United States Patent [19]

Rotter et al.

[11] 4,110,800

[45] Aug. 29, 1978

[54] TURNAROUND SYSTEM

[75] Inventors: Gerhard Rotter, Mission Viejo; Harold Ernest Arns, Chino, both of Calif.

[73] Assignee: BASF Aktiengesellschaft, Ludwigshafen am Rhein, Fed. Rep. of Germany

[21] Appl. No.: 728,549

[22] Filed: Oct. 1, 1976

[51] Int. Cl.[2] .............................................. G11B 15/48

[52] U.S. Cl. ........................................ 360/74; 360/33; 360/19; 360/38; 358/4; 358/8

[58] Field of Search ....................... 360/74, 14, 29, 33, 360/71, 72, 19, 38; 358/127, 48; 179/100.1 VC, 100.1 TC

[56] References Cited

U.S. PATENT DOCUMENTS

| | | | |
|---|---|---|---|
| 3,356,794 | 12/1967 | Felix | 360/38 |
| 3,502,795 | 3/1970 | Camras | 360/74 |
| 3,553,355 | 1/1971 | Forster | 360/33 |
| 3,958,272 | 5/1976 | Rotter et al. | 360/74 |

*Primary Examiner*—Bernard Konick
*Assistant Examiner*—Alan Faber
*Attorney, Agent, or Firm*—Keil, Thompson & Shurtleff

[57] ABSTRACT

A turnaround control arrangement for a color video recording and playback system, in which a color burst frequency at turnaround time is recorded during a certain vertical blanking interval in a distinct pattern; and in which, in playback the tape reversal operation is initiated at least partially under control of this distinct pattern. This "turnaround flag" is also used to control the insertion of the sound signal carrier frequency of the system during turnaround, thereby to reduce the noise due to the loss of the recorded sound signal during turnaround in playback.

15 Claims, 18 Drawing Figures

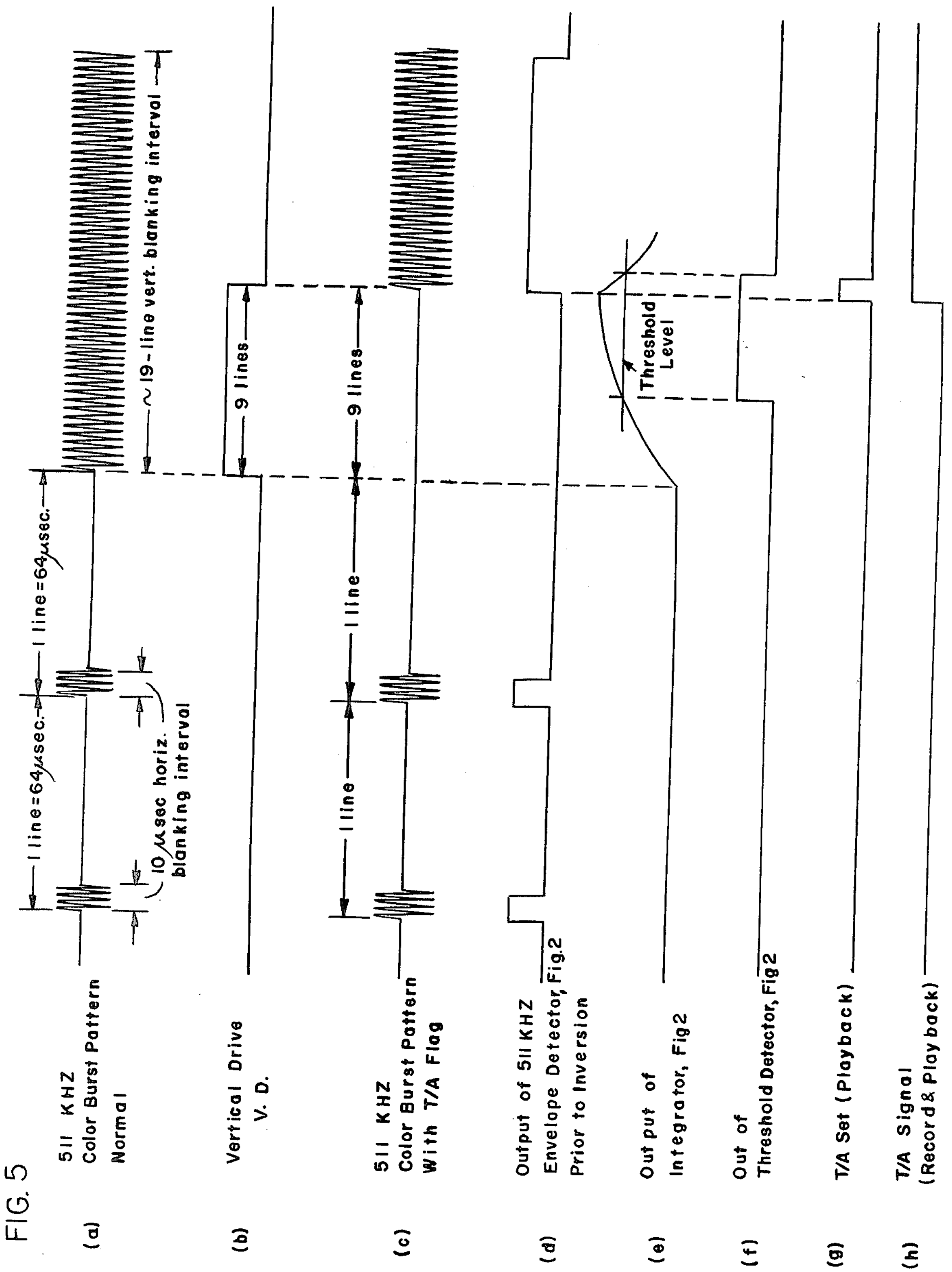
FIG. 5
(a) 511 KHZ Color Burst Pattern Normal
(b) Vertical Drive V. D.
(c) 511 KHZ Color Burst Pattern With T/A Flag
(d) Output of 511 KHZ Envelope Detector, Fig.2 Prior to Inversion
(e) Output of Integrator, Fig2
(f) Out of Threshold Detector, Fig2
(g) T/A Set (Playback)
(h) T/A Signal (Record & Playback)
1 line=64μsec.
1 line=64μsec.
10 μsec horiz. blanking interval
~19-line vert. blanking interval
9 lines
9 lines
1 line
1 line
Threshold Level

TURNAROUND SYSTEM

BACKGROUND OF THE INVENTION

The invention relates to methods and apparatus for the control of tape turnaround in video, particularly color video, tape recording systems.

In one of its aspects the invention may be regarded as an improvement of the turnaround control arrangement disclosed in U.S. Pat. No. 3,958,272 which issued to Rotter et al. on May 18, 1976. The arrangement disclosed in this reference provides for the recording, at the moment when the reversing operation of the tape transport is to be initiated, of a high frequency signal in a range, say 5 to 5.5 mhz, lying above the highest frequencies of the modulated video signal; in playback these high frequency signals are detected as a dropout in a predetermined frequency range and a reversal initiating control signal is produced if the duration of the dropout signal is found to be greater than a predetermined time interval.

While the technique disclosed in the reference, generally speaking, results in a highly accurate control of the reversal of tape movement, it is subject to the danger that at the high carrier frequencies mentioned, dropouts due to dust or abrasion particles and the like between the magnetic head and the tape may on occassion cause turnaround to be triggered at incorrect times. The reason for this is that the signal loss in decibels due to dropout is directly proportional to the frequency, or indirectly proportional to the wave length. More particularly, the loss in db is equal to $55 \times d/\lambda$, where $d$ is the separation of head and tape and $\lambda$ is the wave length. Thus at 5 mhz a dust particle of a given size may give rise to a 20 db loss for example. However, the same dust particle would produce only a 2 db loss at, say, 500 khz. Otherwise expressed, at 500 khz it would take a particle about ten times as large to produce a dropout of the order of 20 db and particles of this size are much less likely to occur.

OBJECTS AND SUMMARY OF THE INVENTION

It is therefore one of the objects of the invention to provide a turnaround control arrangement which, while initiating tape reversal with a precision comparable to that achieved by the above referenced Rotter et al patent, is at the same time considerably less affected by dropouts of the kind mentioned.

Broadly speaking the foregoing and other objects of the invention are met, according to one aspect thereof, by utilizing a burst of the color carrier, which frequency is only a fraction of the white frequency of the modulated video signal. During at least one predetermined vertical blanking interval at turnaround time when no color information for the TV screen is required a turnaround control signal is provided; and a tape reversal operation at least partially under the control of the detection of that signal is initiated. The color burst frequency is also recorded during at least a part of each horizontal blanking interval and, at those times, may be used, for example, for synchronizing or time base error correction purposes.

The utilization of a color burst frequency to provide the turnaround control signal has the advantage that no special equipment, at least in connection with the generation of this frequency, needs to be provided for turnaround control purposes. In addition, although the employed frequency upon demodulation is within the video range, yet, inasmuch as this control signal appears only during blanking, the signal is not visible on the TV screen.

While it is possible to use the mere presence of this color burst frequency during the predetermined vertical blanking interval or intervals as the "turnaround flag" the preferred way of implementing the invention is by recording the color burst frequency during each vertical blanking interval and recording this frequency during a given vertical blanking interval at turnaround time in a distinct pattern. More particularly, in this preferred implementation of the method according to the invention, in the recording mode a preliminary signal is generated which indicates the approach of the tape end, and during a vertical blanking interval following the receipt of that preliminary signal, the color burst is recorded in the distinct pattern; and in the playback mode this distinct pattern is detected and a tape reversal operation is initiated at least partially under the control of that distinct pattern.

In the embodiment described hereinbelow the invention has been disclosed as applied to a color video recording and playback system in which the video information is recorded in two separate video channels. In the first of these channels the luminance information, along with the sync information, is recorded as frequency modulated on a carrier of about 4 mhz and in the second channel the chroma information, along with the color burst, is amplitude modulated on a carrier of about 500 or, more precisely, 511 khz. A time base error correction arrangement for use with a system of this type has been disclosed in copending application Ser. No. 728,550 (V11/75), filed by Buchan et al. on Oct. 1, 1976. The showing of this copending U.S. application should be considered incorporated herein for purposes of disclosure.

In the system disclosed in the Buchan et al. application the aforementioned 511 khz frequency on which the chrominance information is modulated also serves as a color burst frequency which is transmitted during the full length of each horizontal blanking interval and, in the time base error correction technique of the referenced application, the fine correction of the time base error is derived from this color burst. According to the instant invention this color burst frequency—which, as indicated above, is of an order of magnitude well suited for the implementation of this invention—is also recorded during each vertical blanking interval and at turnaround time this recording is effected in a distinct pattern.

In the system of the referenced copending application the audio signal—which, as usual, is received off-air in frequency-modulated form—is recorded as modulated on a sound carrier of approximately 100 khz or, more precisely, 102 khz. In playback this sound carrier and the chroma carrier are processed in the abovementioned second channel, the sound and chroma components are then separated from each other by means of a band split filter and subsequently the sound information is heterodyned to a center frequency of 4.5 mhz at which it can be received by the TV receiver. In playback then, due to the nature of the frequency demodulator in the TV receiver, a very large noise output would normally result at turnaround.

According to another aspect of the present invention, the noise due to the loss of the recorded signal during tape turnaround is reduced by inserting, in playback, the sound signal carrier frequency, in response to the detection of a unique turnaround control signal recorded during at least one vertical blanking interval, at an amplitude which is higher than corresponds to the noise level, at times other than turnaround, of the reproduced frequency modulated sound signal but which is an order of magnitude lower than the last-mentioned sound signal.

BRIEF DESCRIPTION OF THE DRAWINGS

An embodiment of the invention will now be disclosed with reference to the accompanying drawings in which

FIG. 5, consisting of FIGS. 5*a* through 5*h*, is a timing chart illustrating the initiation of turnaround.

DETAILED DESCRIPTION

Referring first to FIG. 5, line (*a*) of the timing chart shown in this figure, illustrates the color burst pattern which is normally, that is during periods other than turnaround, recorded in the system of the present embodiment. The color burst has a frequency of 511 khz, that is a frequency which is only a fraction of the white level of the modulated video signal and is also substantially lower than the standard color burst frequency (3.58 mhz in the case of the NTSC system) transmitted in color TV broadcasting. As shown in line (*a*), this color burst is recorded during each full 10 microsecond horizontal blanking interval, that is once for each horizontal line (once every 64 microseconds); and normally, that is at times other than turnaround, it is also recorded during each entire vertical blanking interval which extends for approximately 19 lines.

In the embodiment shown herein vertical drive pulse VD shown in line (*b*) of FIG. 5 is used as an adjunct in the generation of the turnaround flag. This VD pulse is typically available as one of the pulses produced by the sync generator of the overall video recording and reproducing systems of the general kind contemplated herein. Pulse VD becomes true for the initial period of approximately nine lines of each vertical blanking interval. Circuitry described in detail hereinbelow provides for the recording of the color burst to be suppressed during the presence of this nine-line vertical drive pulse at turnaround time, as shown in line (*c*) of FIG. 5. In this fashion, at turnaround time a distinct color burst pattern is generated which differs from that shown in line (*a*) by the fact that the color burst is absent during the initial nine-line portion of the vertical blanking interval. This distinct color burst pattern is used according to a feature of the invention, as a unique turnaround control signal or "turnaround flag" and in the playback mode the tape reversal operation is effected at least partially under the control of this turnaround flag.

Before describing the circuits used in this embodiment, in recording to produce the turnaround flag and in playback to bring about the tape reversal under the control of this flag, let it be mentioned first that the system described in this embodiment is of the type having a tape transport apparatus with a capstan, 2 tape reel carrying carriages which are transversely movable in the direction towards and away from this capstan, and limit switches which are operated by each of the two carriages near the end of their respective movements. A system of this kind has been described, for example, in U.S. Pat. No. 3,921,933 which issued to G. Rotter et al. on Nov. 25, 1975.

Figure 1:
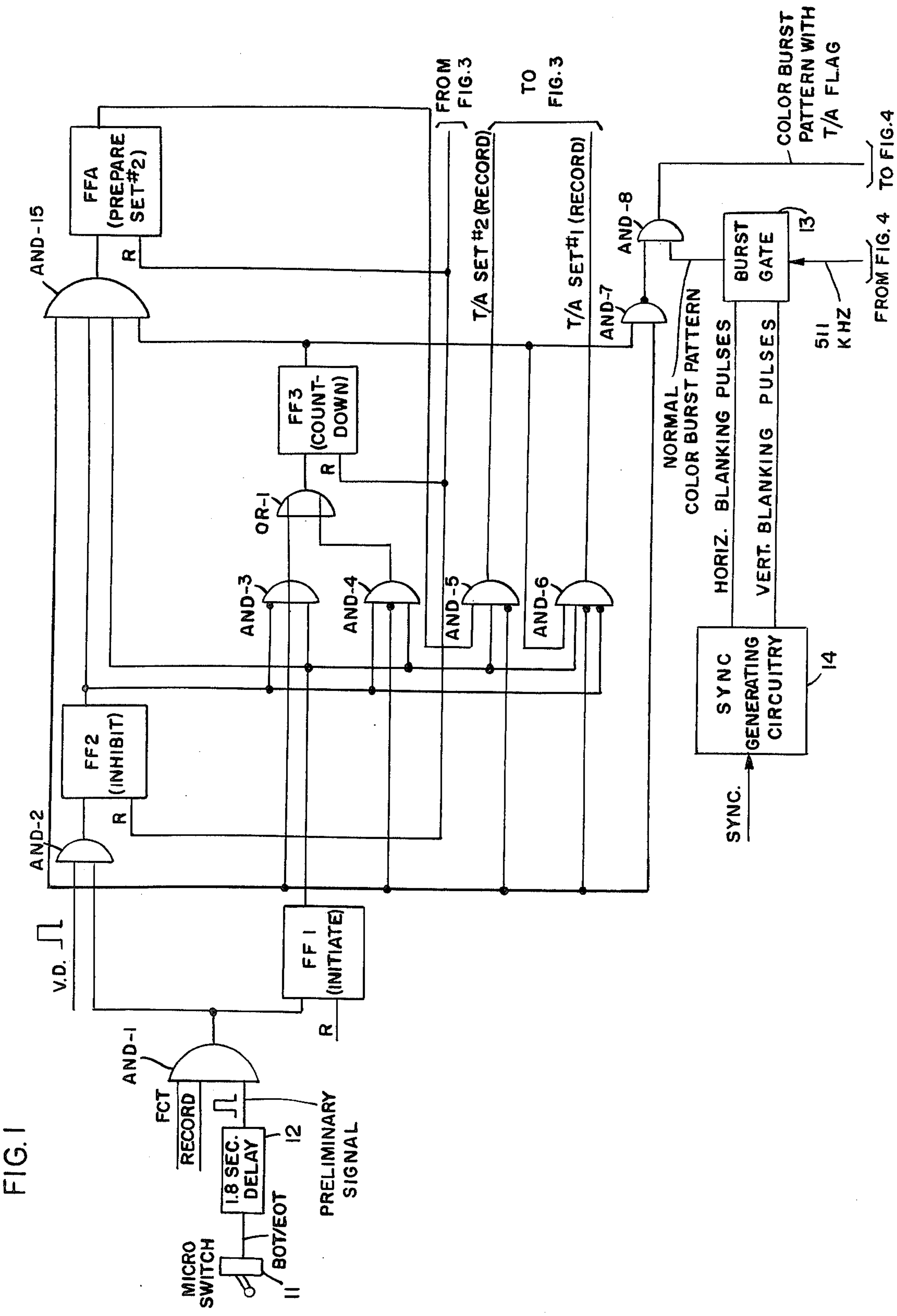
FIG. 1 shows the turnaround control signal record circuit.

In the left portion of FIG. 1, one of these limit switches, assumed to be microswitch 11, has been shown as providing beginning of tape or end of tape signal BOT/EOT which is used to start the 1.8 second delay device 12. At the end of this 1.8 second delay period following the operation of the microswitch, means, not particularly shown, generate a momentary pulse or preliminary signal which is impressed on an input of AND gate AND-1. The means producing this pulse may be, for example, in the form of a single shot, a differentiating circuit or the like. As will be seen from FIG. 1, flip-flop FF-1 which initiates the generation of the turnaround flag, is set upon the appearance of this preliminary signal provided AND-1 determines that the transport is in the record condition and the full count pulse FCT is true. The full count pulse is true while the machine is operating at constant speed whereas the full count pulse is false to indicate that the machine has stopped or is accelerating or decelerating.

It will be observed that with the initiate flip-flop FF-1 set and the vertical drive pulse V.D. true countdown flip-flop FF-3 is set through the medium of AND gate AND-3 and OR gate OR-1, provided that inhibit flip-flop FF-2, the output of which is connected to an inhibit input of gate AND-3, is not in set condition. Flip-flop FF-2 may be regarded as an anticoincidence device and is set only, by way of gate AND-2, if the preliminary signal referred to above occurs at a time when vertical drive pulse V.D. is true. This somewhat exceptional condition will be described in more detail hereinafter. Assuming, however, that inhibit flip-flop FF-2 is not set, then gate AND-7 is opened by the output of countdown flip-flop FF-3 while pulse V.D. is true, and accordingly gate AND-8 becomes disabled. It will thus be seen from FIG. 1 that while gate AND-8 normally gates the 511 khz color burst frequency through each entire vertical blanking interval, the first nine lines of the first vertical blanking interval following the generation of the preliminary signal are suppressed as long as pulse V.D. is true after FF-3 has been set. As a result, in the usual case, when the vertical drive pulse is false at the occurrence of the preliminary signal the turnaround flag starts to be written at the beginning of the first V.D. pulse following the end of the 1.8 second delay; and actual turnaround is started at the end of this vertical drive pulse. The latter result stems from the fact that upon the setting of FF-3 when V.D. becomes false and gate AND-6 is opened the turnaround SET #1 (Record) conductor is activated. This leads, through the medium of OR gate OR-2, FIG. 3, to the setting of flip-flop FF-5 which in its turn causes the turnaround signal to be generated. This condition as far as the recording mode is concerned, is illustrated in line (*h*) of the timing chart, FIG. 5

Figure 4:
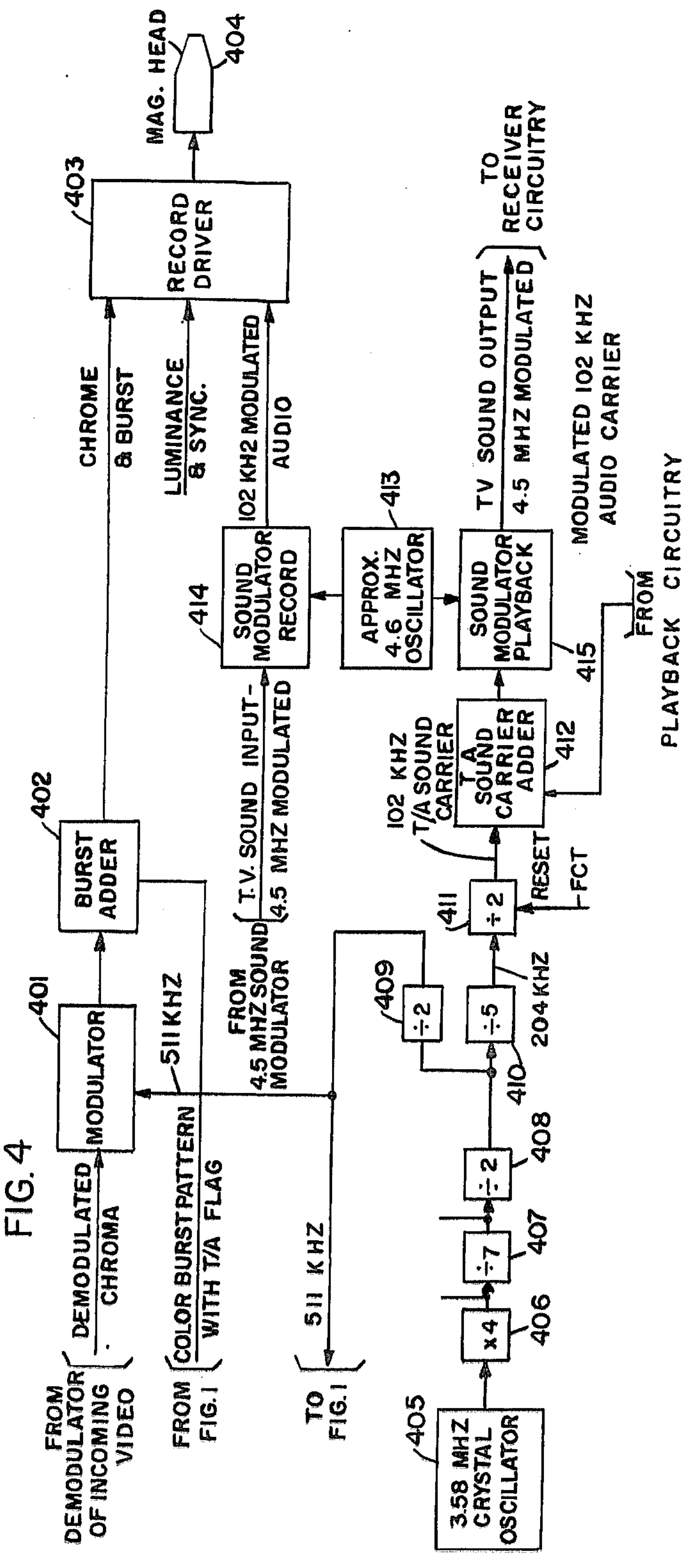
FIG. 4 is a diagrammatic showing of the sound modulating and demodulating circuitry, the circuitry effecting the production of the sound carrier and also that bringing about the insertion of the sound carrier at turnaround time.

The "writing" of the turnaround flag in the manner described above presupposes that the normal color burst pattern as illustrated in line (*a*) of FIG. 5 is supplied to the lower input of AND gate AND-8. The normal color burst pattern is presented to this input of AND-8 due to the fact that burst gate 13 in the right hand bottom corner of FIG. 1 which is supplied with the 511 khz burst frequency as generated by the circuit described in more detail below in conjunction with FIG. 4 is controlled by horizontal blanking pulses and vertical blanking pulses provided by sync generating circuitry 14 controlled by the system sync, all as shown in FIG. 1.

In the exceptional case that the preliminary signal triggered at the end of the 1.8 second delay occurs while the vertical drive pulse happens to be true, inhibit flip-flop FF-2 is actuated to insure that, even in this event, the full length of a vertical drive pulse is available for writing the turnaround flag. The setting under this condition of inhibit flip-flop FF-2 prevents flip-flop FF-3 from being set upon the occcurrence of this V.D. pulse. However, at the end of this vertical drive pulse flip-flop FF-3 is set by way of AND gate AND-4 and OR gate OR-1 so that the turnaround flag is generated at this time. In this case actual turnaround starts only at the end of the next vertical drive interval. This is brought about by the fact that when pulse V.D. becomes true again with inhibit flip-flop FF-2 in set condition and FF-3 also set, flip-flop FF-4 is set by way of AND gate AND-15. Subsequently, when the V.D. pulse becomes false conductor T/A Set #1 (record) is activated by way of AND gate AND-5 so that flip-flop FF-5, FIG. 3, now becomes set to initiate the turnaround signal.

Figure 2:
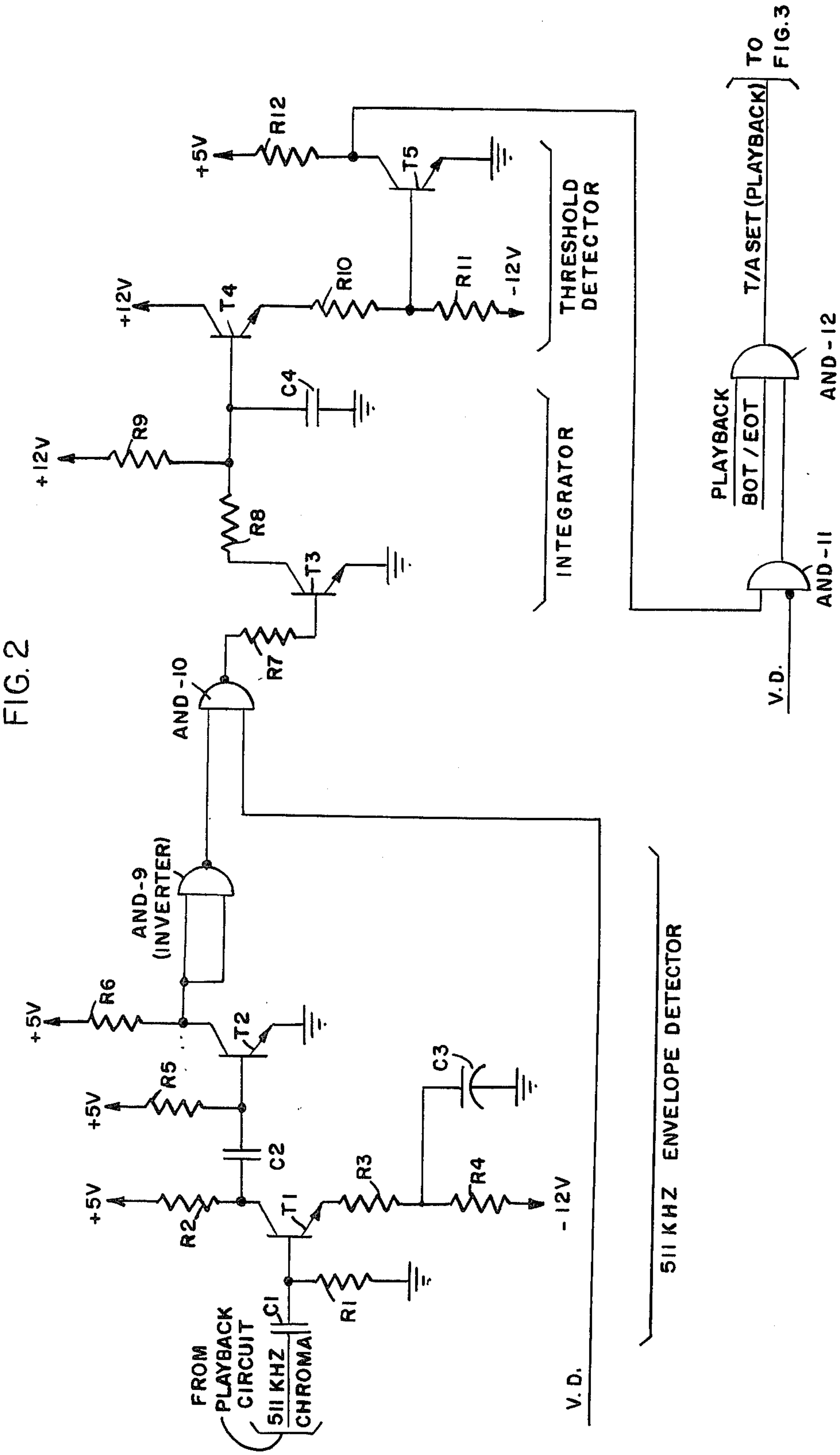
FIG. 2 shows the turnaround control signal detector circuit.

Turning now to the circuitry of the present embodiment which is used to set the turnaround in motion upon the detection of the recorded turnaround flag in playback, the 511 khz color burst as provided by the playback circuitry of the system is shown at the left end of FIG. 2. More particularly, this input to FIG. 2 is derived from the band split filter shown in channel-2 of the referenced copending application of Buchan et al. The detector circuitry shown in FIG. 2 comprises first a 511 khz envelope detector including transistors T-1, T-2 and inverter AND-9 with their associated circuit components; AND gate AND-10; an integrator comprising transistor T-3 and capacitor C-4 with their associated resistors; a threshold detector including transistors T-4 and T-5 and associated resistors; and gates AND-11 and AND-12.

It may be helpful to indicate the general operation of the circuit, FIG. 2, first as follows: in playback, the envelope detector gives an output which is shown, prior to inversion by inverter AND-9, on line (*d*) of FIG. 5, as consisting of a pulse during each horizontal blanking interval as well as a pulse which extends from the end of the nine-line vertical drive pulse to the end of the vertical blanking interval. The integrator shown in FIG. 2 is designed to reach a given threshold voltage only when the color burst has not appared for at least 3½ lines. This guards against turnaround being initiated in response to momentary dropouts that might occur during the initial portion of other vertical blanking intervals, see line (*e*) of FIG. 5. AND gate AND-10, in conjunction with the integrator and the threshold detector serves to enable turnaround at the point during the vertical drive pulse when the integrator reaches the predetermined threshold voltage. Logic gate AND-10 has two inputs, one being the vertical drive pulse and the other being the inverse of the detected chroma burst envelope. Thus the output of AND gate AND-10 is high when the vertical drive pulse is true and no envelope is being detected. Capacitor C-4 of the integrator is permitted to charge only when the output of AND gate 10 is high. The threshold detector finally provides an output connected to the upper input, FIG. 2, of AND gate AND-11 when the integrator has reached the turnaround voltage, see line (*f*) of FIG. 5. Due to the connection of the V.D. pulse to an inhibit input of gate AND-11 the turnaround is not actually effected until the end of V.D., see line (*g*). The effect of using the end of the vertical drive period for actually starting turnaround is to provide a definite and predetermined point on the tape for actual turnaround. If the output of the threshold detector itself were used, rather than the end of the vertical drive pulse following the threshold detector output, the actual time of turnaround would depend upon the time constant of the R-C integrator. Thus the actual point of turnaround would vary with tolerances of the R-C components. Having a fixed point controlled by the V.D. pulse—as is also the end of the turnaround, as described below—for turnaround has the result of a less detectable picture disturbance when turnaround occurs.

Figure 3:
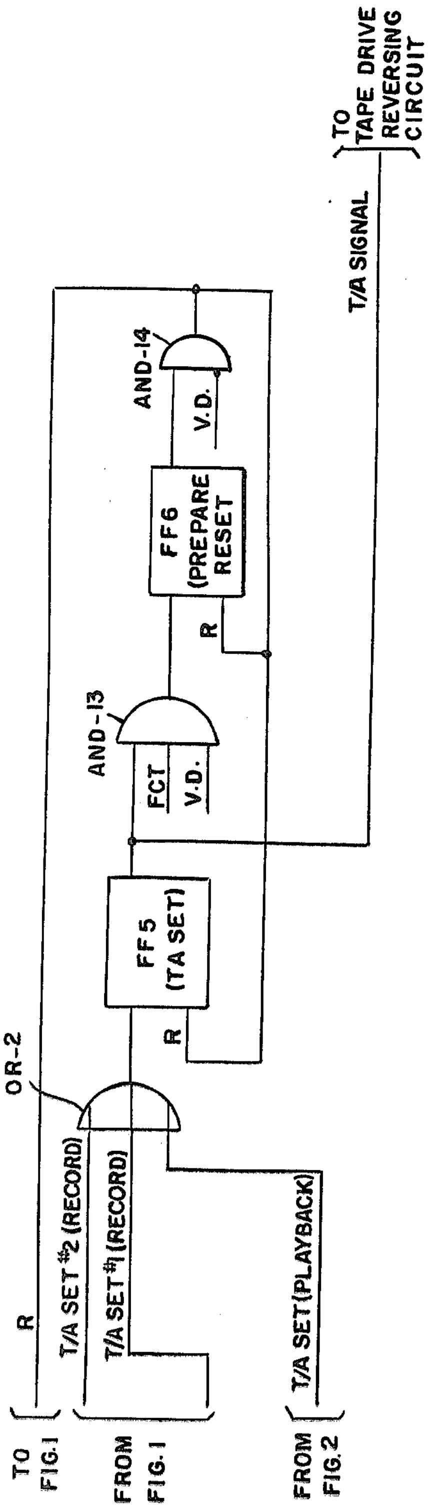
FIG. 3 illustrates logic common to the control signal record and detector circuits.

By way of further detail, line (*d*) of FIG. 5 shows the output of transistor T-2 which at the same time is the input to inverter AND-9. It will thus be seen that the output of this inverter is true when 500 khz is absent and false when this chroma burst is present. As indicated above, AND gate AND-10 is opened when 511 khz is not present and the V.D. pulse is true. With the gate AND-10 enabled, transistor T-3 is rendered non-conductive, thereby to disable the discharge path of capacitor C-4, that is permit this capacitor to charge. This then occurs at the beginning of the nine-line vertical drive pulse shown on line (*b*) of FIG. 5. Subsequently, when this V.D. pulse becomes false, transistor T-3 is turned on and capacitor C-4 is permitted to discharge via the output circuit of transistor T-3 to ground. It may also be added that there is interposed between gate AND-11 and the T/A set (playback) conductor, an AND gate AND-12 which makes the activation of this conductor also dependent on the presence of the beginning of tape or end of tape signal BOT/EOT and also the fact that the machine happens to be in playback condition. The T/A Set (playback) conductor forms another input to gate OR-2, FIG. 3, in short, the circuit shown in FIG. 3 is common to the control signal record circuit FIG. 1 and the control signal detector circuit FIG. 2.

Figure 6:
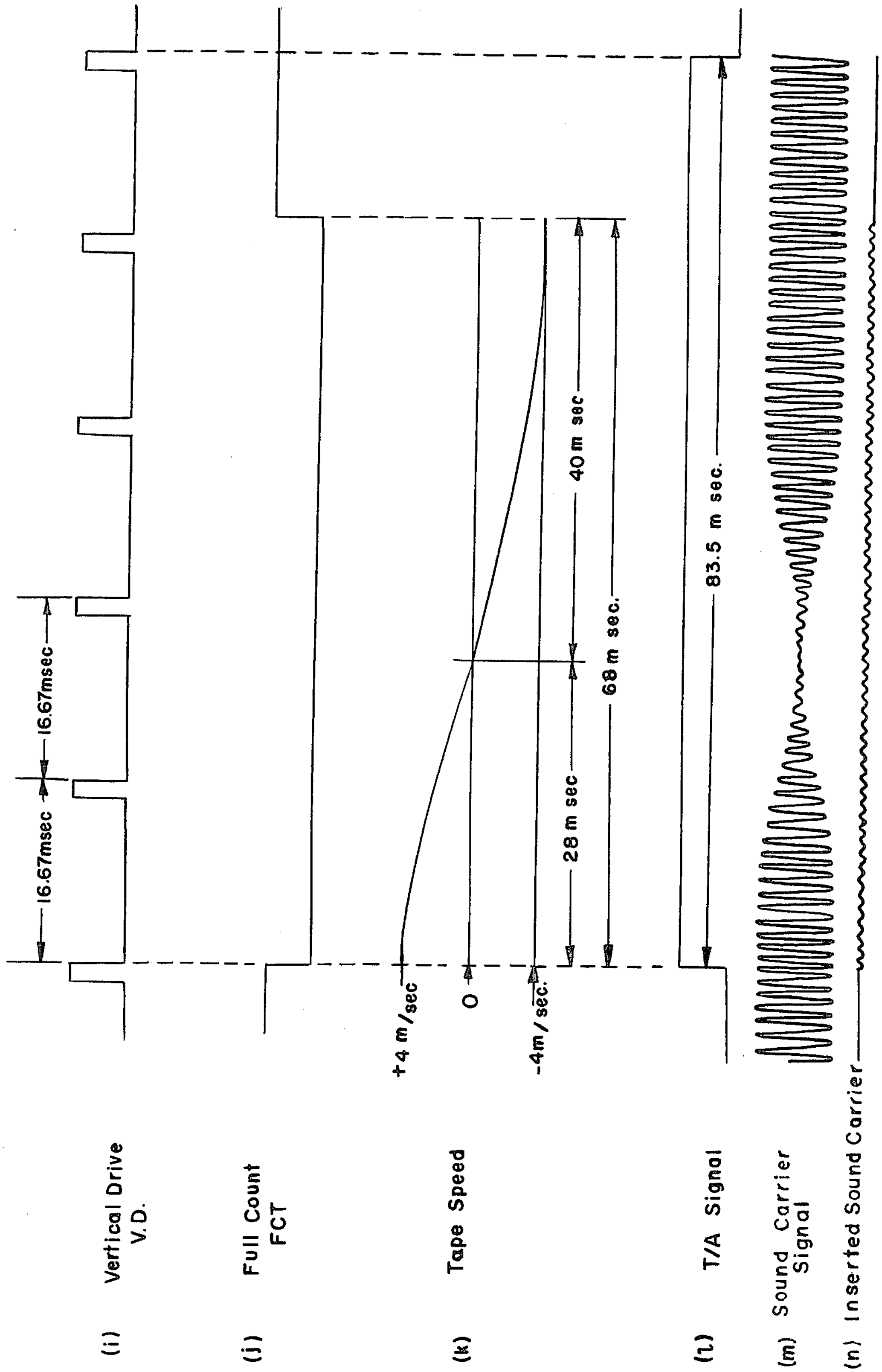
FIG. 6 is another timing chart, continuing FIGS. 6*i* through 6*n*, drawn to a smaller scale than the timing chart of FIG. 5 and illustrating the reversing process itself.

As mentioned above, FIG. 6 is a timing chart which shows the actual turnaround process and is drawn to a scale somewhat smaller than that used for FIG. 5. Both the vertical drive pulse V.D., line (*i*), and the T/A signal, line (*l*), appear again in FIG. 6, with both the beginning and the end of this last signal shown in FIG. 6. The turnaround signal, also as indicated above, sets the tape reversal in motion in a manner well known in the art, reference being made for example to U.S. Pat. No. 3,487,175. As illustrated in line (*j*) of FIG. 6 the full count signal FCT is false throughout the reversal operation. Line (*k*), FIG. 6 shows how the tape speed is reduced from approximately +4 meters per second at the beginning of turnaround to zero within approximately 28 milliseconds; and is brought up to roughly −4 meters per second within about 40 milliseconds. The entire turnaround time, therefore, is 68 milliseconds. Line (*m*) shows the reduction of sound carrier amplitude during the turnaround process. The inserted sound carrier is shown in line (*n*).

Again, a definite point in time is provided for the termination of the turnaround signal, that is as shown in FIG. 6 the signal ends at the end of the first vertical drive pulse following the end of actual turnaround. FIG. 3 illustrates how this is accomplished by means of AND gates AND-13 and AND-14 and prepare reset flip-flop FF-6. As will be seen from FIG. 5, flip-flop FF-6 is set after flip-flop FF-5 has been set, and both the FCT signal and the vertical drive pulse have become true again. Subsequently, because of the inverted connection of the V.D. pulse to the lower input of gate AND-14, flip-flop FF-5 is reset at the end of this vertical drive pulse, and consequently the T/A signal is terminated. The output of AND gate AND-14 has been shown connected also to the reset input R of flip-flop FF-6 and also to the R inputs of all the flip-flops shown in FIG. 1. Thus, with the opening of gate AND-14 the circuits shown in both FIGS. 1 and 3 are restored to normal. The termination of the T/A signal may be used for providing other signals in the system indicating the resumption of normal operation of the recorder. More specifically, while the end of the FCT pulse which lasts throughout the mechanical turnaround period, occurs after 68 milliseconds, the end of the T/A pulse which lasts throughout the total turnaround period, occurs after 83.5 milliseconds. The difference, 15.5 milliseconds, in the length of these two pulses is available for the completion of the cycle by the electronic circuitry.

To round out the description of the turnaround flag recording and detecting circuitry, reference is made to FIG. 4 which illustrates in its top portion how the color burst pattern including this flag, as produced by the logic circuitry of FIG. 1, is recorded on the magnetic tape. This portion of FIG. 4 shows how the demodulated chroma derived from the modulator of the incoming video signal is amplitude modulated on a modulator 401 using the 511 khz carrier and how the output of this modulator is impressed, via a burst adder 402, on the chroma and burst input of the record driver circuit 403, the output of which is connected to magnetic head 404.

As will be noted, the luminance and sync information as well as the 102 khz modulated audio are separately impressed on the record driver. The aforementioned burst adder 402 serves to add the unique color burst pattern initiating turnaround, to the 511 khz modulated chroma intelligence. Moreover, the left bottom of FIG. 4 illustrates diagrammatically how the 511 khz carrier, also serving as a color burst, is derived from a 3.58 mhz crystal oscillator 405 through a multiplier stage 406 and a number of divider stages 406, 407, 408 and 409.

By way of further elaboration on the description of the way in which the turnaround control signal is produced and detected, it should be noted that although FIGS. 1 and 3 show the use of logic circuitry for this purpose, it is equally possible to, instead, implement the functions in question, say, by means of a microprocessor which is programmed accordingly.

With the turnaround arrangement described above, and because of the high tape speeds of the order of 4 meters per second typically employed in linear video tape recorders of the kind visualized herein, it is possible to continue the recording of the video information during turnaround. Yet, there will be only a short interval of, say, 20 or 30 milliseconds around the center of the turnaround period where the video information becomes unintelligible due to the tape speed at that point being zero or near zero. Nevertheless, because of the briefness of this interval, the disappearance of the video signal on the screen of the TV receiver will not be noticeable to the eye.

Because of the much lower frequencies involved in the audio signal, the foregoing result does not apply to this latter signal. On the contrary, a considerable burst of audible noise would normally appear in the audio output on turnaround. This result is due to a large extent to the characteristics of the frequency demodulator in the TV receiver since this frequency demodulator typically contains, or has associated therewith, a variable-gain amplifier-limiter which tends to emphasize the noise amplitude. During approximately 20 milliseconds of the turnaround period then, while the frequency input to this audio demodulator is outside the range of this unit, the aforementioned loud noise burst would result. More specifically, in the embodiment disclosed, the sound signal will ordinarily be at about 50 millivolts and the noise level will be approximately 1 millivolt; however, when the audio signal drops out during turnaround, the noise becomes the predominating signal and gives rise to the above loud audible noise burst.

As indicated earlier, however, according to another aspect of the invention, the noise due to the loss of the recorded signal during tape turnaround is reduced by inserting, in playback, the sound signal carrier frequency, in response to the detection of a unique turnaround control signal recorded during at least one vertical blanking interval, at an amplitude which is higher than corresponds to the noise level, at times other than turnaround, of the reproduced frequency modulated sound signal but which is of an order of magnitude lower than that of the lastmentioned sound signal.

With the amplitude of the injected carrier so chosen, a 20 to 30 millisecond interruption of the sound signal will occur but as long as this dropout is filled with the sound signal carrier of the indicated level, this interruption is not audible since the human ear cannot detect interruptions of such a short duration. At times when the off-tape sound carrier is high in amplitude (beginning and end of turnaround (FIG. 6, line *m*)) the signal to noise ratio of the reproduced sound is only slightly reduced by the inserted carrier. Because the insertion is only done for a period of 68 milliseconds, the human ear will not detect this deterioration. In the case of the embodiment described herein, the inserted sound carrier signal has a frequency of 102 khz and an amplitude 3 to 4 times the noise amplitude, that is it has an amplitude of approximately 4 millivolts.

Reverting again to FIG. 4, the center portion of this figure shows the processing of the sound signal, both in recording and playback, in block diagram form, and it also diagrammatically shows the insertion of the sound carrier turnaround.

As will be seen from FIG. 4, the 4.5 mhz frequency modulated TV sound input which is supplied from the 4.5 mhz sound modulator (not shown) is impressed on sound modulator (record) 414 which has another input connected to an oscillator providing a frequency of approximately 4.6 mhz. Sound modulator 414 is in the nature of a heterodyning mixer and it thus produces the 102 khz modulated audio signal which, as mentioned earlier, is connected to the record driver 403 for impression on magnetic head 404. For the selection of one of the two sidebands of the modulator output, a filter is required in the output connection of this modulator but this filter, in the interest of clarity, has not been shown in the drawing. The showing of other such filters used in FIG. 4 has been similarly omitted.

In the playback mode the modulated 102 khz audio carrier which is supplied by the playback circuitry in a manner more specifically shown in the above referenced copending Buchan et al application is impressed, by way of adder 412, on the principal input of sound modulator (playback) 415 which, again has another input connected to the output of 4.6 mhz oscillator 413. Sound modulator 415 also is of the heterodyning mixer type; in fact, preferably the same unit is used for modulators 414 and 415, and this single unit is switched into the recording and playback circuits as required. The details of this have not been particularly shown. The output of playback modulator 415, then, yields a 4.5 mhz modulated TV sound output which is impressed on the TV receiver circuitry and, more specifically, on the FM demodulator (not shown) therein.

The aforementioned adder 412 serves to insert the 102 khz sound carrier during turnaround. This 102 khz carrier, as shown in FIG. 4 is derived from 3.5 mhz crystal oscillator 405 through the medium of multiplier 406 and dividers 407, 408, 410 and 411. This last frequency divider 411 has a reset input to which the full count signal FCT is connected as shown. As a result of this connection, this unit—which may be in the form of a multivibrator—will be normally disabled but will be enabled during turnaround time when signal FCT becomes false as shown in FIG. 6. Instead of the full count signal FCT, it is also possible to use the inverted T/A signal for this purpose.

It should be understood that the embodiment described herein is offered as an example only and is in no way meant to limit the scope of the invention.

We claim:

1. In a color video tape recording and playback system,
a turnaround control method
comprising in the recording mode:
recording, during at least a part of each horizontal blanking interval, a color burst having a frequency which is only a fraction of the white frequency of the modulated video signal, and
recording said color burst frequency during at least one predetermined vertical blanking interval at turnaround time to provide a turnaround control signal; and
comprising in the playback mode:
detecting said recorded turnaround control signal and
initiating a tape reversal operation at least partially under the control of the detection of said signal.

2. In a color video tape recording and playback system,
a turnaround control method
comprising in the recording mode:
recording a color burst during at least a part of each horizontal blanking interval and each vertical blanking interval, said color burst having a frequency which is only a fraction of the white frequency of the modulated video signal, and
recording said color burst frequency during a predetermined vertical blanking interval at turnaround time in a distinct pattern; and
comprising in the playback mode:
detecting said distinct pattern and
initiating a tape reversal operation at least partially under the control of the detection of said distinct pattern.

3. In a color video tape recording and playback system of the type in which a color burst of predetermined frequency is recorded during at least a part of the horizontal blanking interval, a tape turnaround control method
comprising in the recording mode:
(a) recording said color burst frequency also during each vertical blanking interval
(b) generating a preliminary signal indicating the approach of the tape end, and
(c) recording, during a vertical blanking interval following the receipt of said preliminary signal, said color burst frequency in a distinct pattern; and
comprising in the playback mode:
(d) detecting said distinct pattern, and
(e) initiating a tape reversal operation at least partially under the control of the detection of said distinct pattern.

4. In a color video tape recording and playback system a tape turnaround control method as claimed in claim 3, wherein step (c) comprises preventing, during the first vertical blanking interval following a predetermined time after the receipt of said preliminary signal, the initial portion of said color burst from being recorded, thereby causing said color burst to be recorded during the last-mentioned vertical blanking interval in a distinct pattern.

5. In a color video tape recording and playback system of the type in which the chrominance information of the color video signal is recorded as modulated on a carrier frequency, and in which a color burst of said frequency is recorded, during at least a part of the horizontal blanking interval, along with said chrominance information, a tape turnaround control method
comprising in the recording mode:
(a) recording said color burst frequency also during each vertical blanking interval
(b) generating a preliminary signal indicating the approach of the tape end, and
(c) recording, during a vertical blanking interval following the receipt of said preliminary signal, said color burst frequency in a distinct pattern; and
comprising in the playback mode:
(d) detecting said distinct pattern and
(e) initiating a tape reversal operation at least partially under the control of the detection of said distinct pattern.

6. In a video tape recording system of the type in which the sound signal information is recorded as frequency modulated on a sound signal carrier frequency,
a method of reducing the noise due to the loss of the recorded signal during tape turnaround in playback, said method comprising
recording a unique turnaround control signal during at least one predetermined vertical blanking interval, and
in playback inserting said sound signal carrier frequency, in response to the detection of said turnaround control signal, during at least a part of the turnaround period.

7. In a video tape recording system the method as claimed in claim 6 wherein the last-mentioned step of said method comprises, in playback, inserting said sound signal carrier frequency, in response to the detection of said turnaround control signal, during at least a part of the turnaround period, at an amplitude which is higher than corresponds to the noise level of the reproduced frequency modulated sound signal but which is of an order of magnitude lower than that of the last-mentioned sound signal.

8. In a color video tape recording and playback system, a tape turnaround control arrangement comprising
apparatus effective in the recording mode for recording on said tape a unique turnaround control signal, said apparatus including
means for recording a color burst frequency during at least part of each horizontal blanking interval and also each vertical blanking interval,
means generating a preliminary signal indicating the approach of the tape end,
meand providing a pulse occurring during a portion of each said vertical blanking interval,
means jointly controlled by said preliminary signal and by said pulse for preventing recording of said color burst frequency during said portion of a vertical blanking interval following the receipt of said preliminary signal so as to cause said color burst frequency to be recorded during said vertical blanking interval in a distinct pattern representing said unique turnaround control signal, and
apparatus effective in the playback mode for initiating a tape reversal operation at least partially under the control of said recorded unique turnaround control signal.

9. In a color video tape recording and playback system, a turnaround control arrangement as claimed in claim 8, wherein said pulse providing means include means producing a pulse occurring during the initial portion of each said vertical blanking interval.

10. In a color video tape recording and playback system a turnaround control arrangement as claimed in claim 8, wherein said recorded color burst frequency is substantially lower than the standard color burst frequency transmitted in color TV broadcasting.

11. In a color video tape recording and playback system a turnaround control arrangement as claimed in claim 9, wherein said apparatus initiating tape reversal in the playback mode include:
envelope detector means detecting said recorded color burst frequency
integrating means connected to the output of said detector means for causing a capacitor-charging and-discharging operation to be effected under the control of said pulse, and
threshold detector means connected to the output of said integrating means for providing an output voltage while the last-mentioned output exceeds said threshold.

12. In a color video tape recording and playback system the turnaround control arrangement as claimed in claim 11 wherein said apparatus initiating tape reversal in the playback mode further include
means jointly controlled by said preliminary signal when occurring in playback, by the presence of said output voltage and by the termination of said pulse, for producing a turnaround signal making said tape reversal effective.

13. In a color video tape recording and playback system a turnaround control arrangement as claimed in claim 12, wherein said apparatus initiating tape reversal in the playback mode further include
timing means effective a predetermined time after the production of said turnaround signal, and
means jointly controlled by said timing means and said pulse providing means for terminating said turnaround signal upon termination of the first said pulse occurring after said timing means has become effective.

14. In a color video tape recording and playback system a turnaround control arrangement as claimed in claim 9,
wherein said system is of the type comprising a tape transport apparatus having a capstan, two tape reel carrying carriages transversely movable towards and away from said capstan, and limit switching means operated by each said carriage near the end of its movement;
wherein the means generating said preliminary signal include time delay means operated by said limit switching means to generate said preliminary signal a predetermined time after the operation of said limit switching means, and
wherein said jointly controlled means which cause said unique turnaround control signal to be recorded on said tape in the recording mode include circuit means normally effective in response to the beginning of the first said pulse following said preliminary signal to prevent the recording of said color burst frequency, and normally effective in response to the end of the first said pulse to produce a turnaround signal making tape reversal effective in the recording mode.

15. In a color video tape recording and playback system a control arrangement as claimed in claim 14, wherein said circuit means include antiocoincidence means operated in the event of coincidence of said pulse and said preliminary signal to control said circuit means to become effective in response of said first pulse to prevent the recording of said color burst frequency, and to become effective in response to the end of the next following pulse to produce the last-mentioned turnaround signal.

* * * * *